United States Patent [19]

Liberman et al.

[11] 4,125,196

[45] Nov. 14, 1978

[54] METHODS FOR HANDLING REFUSE CONTAINERS

[75] Inventors: Harvey W. Liberman; Paul L. Goranson, both of Knoxville; R. Houston Ratledge, Jr., Maryville; John C. Salyers, Oak Ridge, all of Tenn.

[73] Assignee: Carrier Corporation, Syracuse, N.Y.

[21] Appl. No.: 798,731

[22] Filed: May 19, 1977

Related U.S. Application Data

[62] Division of Ser. No. 641,375, Dec. 17, 1975, Pat. No. 4,044,905.

[51] Int. Cl.[2] .......... B65G 65/04

[52] U.S. Cl. .......... 214/152; 49/148; 100/229 A; 214/310

[58] Field of Search .......... 214/38 R, 38 A, 44 R, 214/44 A, 54, 82, 152; 212/4; 49/148, 276; 100/229 A

[56] References Cited

U.S. PATENT DOCUMENTS

| | | | |
|---|---|---|---|
| 423,500 | 3/1890 | Townsend | 214/54 |
| 1,229,222 | 6/1917 | Bull | 214/54 |
| 2,142,451 | 1/1939 | McEwan | 212/4 |
| 3,610,139 | 10/1971 | Bowles | 100/229 A |

*Primary Examiner*—Lawrence J. Oresky
*Attorney, Agent, or Firm*—J. Raymond Curtin; Donald F. Daley; John S. Sensny

[57] ABSTRACT

The present disclosure involves a refuse loading station comprising a refuse packer assembly, a refuse container and a loading dock disposed in front of the packer assembly. The container includes a vertically slidable closure. The clearing member includes a cutter edge for severing refuse, and an inclined refuse deflecting surface located under a bottom edge of the closure when the container is in a refuse loading position. The refuse clearing member includes a mechanism for partially raising the closure in response to movement of the container to a refuse loading position so as to locate the bottom edge of the closure above the deflecting surface. Power actuable mechanism is provided for raising and lowering the clearing member. When the clearing member is raised it contacts and raises the closure, and when the clearing member is lowered it contacts and lowers the closure.

3 Claims, 22 Drawing Figures

FIG.14
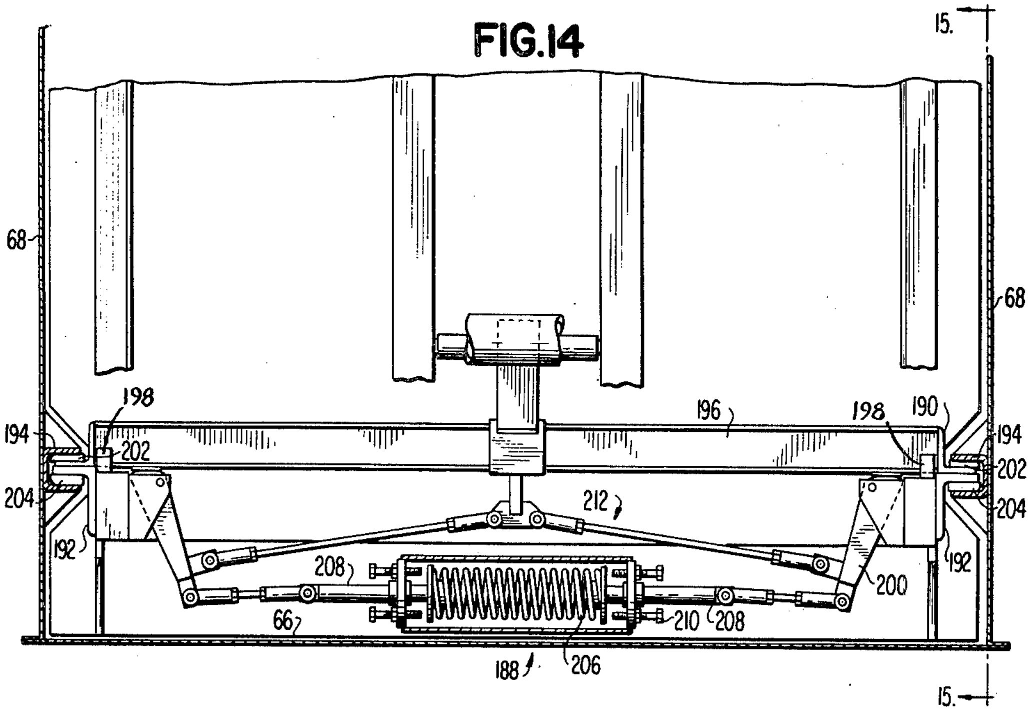
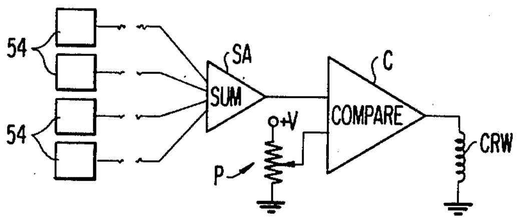
FIG.16
FIG.15
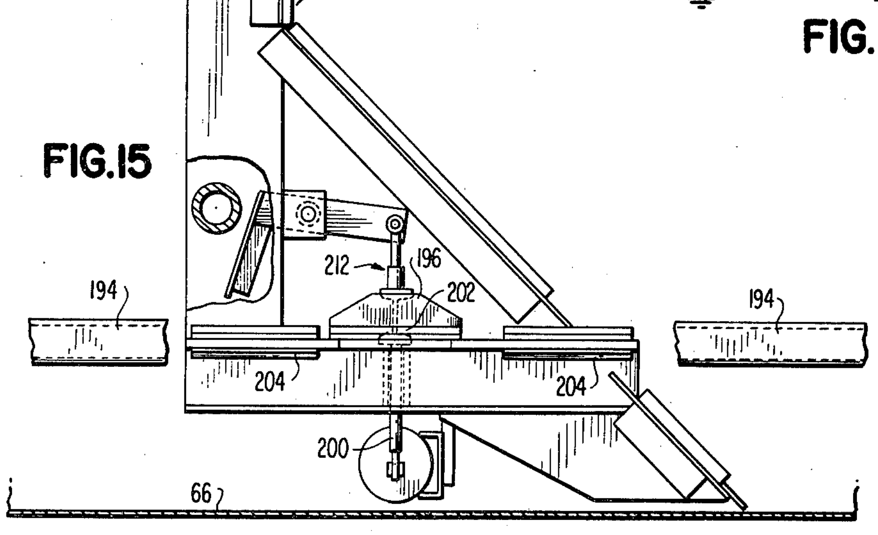

METHODS FOR HANDLING REFUSE CONTAINERS

This is a division, of application Ser. No. 641,375 filed Dec. 17, 1975, now U.S. Pat. No. 4,044,905.

RELATED INVENTIONS

Attention is directed to related subject matter disclosed in copending, commonly assigned U.S. application Ser. Nos. 641,371, now U.S. Pat. No. 4,044,914, issued 8/30/77 filed Dec. 17, 1975 by Donald J. Hopkins, John C. Salyers, and Paul L. Goranson for Refuse Container; 641,757, now U.S. Pat. No. 4,044,905, issued 8/30/77 filed on Dec. 17, 1975 by Harvey W. Liberman and John C. Salyers for Methods and Apparatus for Transferring Refuse; 641,524, filed on Dec. 17, 1975 by Samuel E. Harvey, J. Stephen Whitehead, and Paul L. Goranson for Methods and Apparatus for Unloading Refuse Containers; 641,370 filed on Dec. 17, 1975 by Harvey W. Liberman and J. Stephen Whitehead for Methods and Apparatus for Controlling an Hydraulic Cylinder. The subject matter of such applications is hereby incorporated herein by reference as if set fully forth herein.

BACKGROUND AND OBJECTS OF THE INVENTION

This invention relates to refuse handling and more particularly to methods for handling refuse containers.

One aspect of environmental consideration which has become of major concern involves the disposal of refuse. The need for practicable techniques for disposing of the great amounts of rubbish being produced daily has given rise to a number of proposals in this area. One common approach has been to dump refuse into sanitary land fill areas. A more recent development involves the transfer of refuse to a refuse-handling facility, such as a power generating plant, wherein the refuse is consumed as fuel in the production of energy. In order to assure the economic feasibility of this technique, it is important that it be performed in as efficient and economical a fashion as possible. The present invention involves one phase of this technique, namely the handling of a refuse container.

According to conventional practice, refuse is collected by trucks which travel from one source of refuse to another. When the truck is full, it is driven to the disposal area and emptied, and then returned to pick up more refuse. Recently, transfer stations have been introduced to the system to minimize travel of individual trucks from refuse pickup points to the disposal area. These transfer stations include a compaction device which receives refuse from the collection trucks, and then compresses the refuse, so that it will occupy a smaller volume. The refuse is then transferred to another larger vehicle by which it is transported to a disposal area. An example of one of these systems is disclosed in Bowies U.S. Pat. No. 3,610,139.

These conventional transfer stations require personnel to operate the packer, as well as attendants to supervise the unloading of refuse from the packer into trucks. Often, time is lost in attempting to align the truck body with the packer, so that the refuse is transferred into the truck body without spillage. Moreover, problems frequently occur when attempting to fully shut a closure of the container upon the compacted contents thereof.

It would be desirable to perform such operations with a minimal number of on-hand personnel. Understandably, significant savings can be realized from a system requiring little supervision and attention. Of course, this should be accomplished while avoiding the use of unduly complicated and sophisticated equipment which typically involve high costs and frequent servicing.

It is, therefore, an object of the present invention to provide improved methods for handling a refuse container.

It is another object of the invention to provide refuse container handling methods which permit the efficient loading of refuse from a packer into a container while requiring minimal supervision and attention.

BRIEF SUMMARY OF A PREFERRED EMBODIMENT OF THE INVENTION

These objects are achieved by the present invention which involves a refuse loading station comprising a refuse packer assembly, a refuse container having a movable wall member, and a loading dock disposed in front of the packer assembly. The loading dock includes a track arrangement on which is mounted a loading carriage for limited movement toward and away from the packer assembly. The carriage is structured for removably supporting the refuse container. A refuse clearing member is provided for clearing refuse situated between the packer assembly and the container subsequent to said container being loaded. A power actuable mechanism is provided on the loading dock for reciprocating the carriage to shift the container toward the packer assembly to a refuse loading position, and to shift the container away from the packer assembly to a container removal position. The carriage is movably mounted on a weighing mechanism which provides an indication of the weight of the container when the container is in a refuse loading position. The weighing mechanism is operably coupled to the packer assembly for controlling the loading of the container in accordance with a preselected container weight.

The container is advanced to a refuse loading position allowing locking hooks to be moved to a locking position. Then the container is backed-off to bring the container into firm engagement with the locking hooks to minimize vibration during loading.

The container includes a vertically slidable closure. The clearing member includes a cutter edge for severing refuse, and an inclined refuse deflecting surface located under a bottom edge of the closure when the container is in a refuse loading position. The refuse clearing member includes a mechanism for partially raising the closure in response to movement of the container to a refuse loading position so as to locate the bottom edge of the closure above the deflecting surface. Power actuable mechanism is provided for raising and lowering the clearing member. When the clearing member is raised in contacts and raises the closure, and when the clearing member is lowered it contacts and lowers the closure. Loading of the container is achieved by inserting refuse into the container by a reciprocable packer head. As loading progresses, an ejector head of the container is urged rearwardly by the oncoming refuse. Mechanically induced friction forces are applied to the ejector head to resist such movement and thereby regulate the degree of compaction of the refuse which ensues.

An electric control circuit is operably connected to power actuable devices for reciprocating the carriage, the refuse clearing member, and the refuse packer head. An electric test circuit is also provided which enables these power actuable devices to be actuated independently of the control circuit for test purposes. The control circuit is arranged to automatically reciprocate the packer head during a first mode of operation wherein the packer head, during a forward stroke, is advanced beyond the path of travel of the clearing member. Subsequently, a power-assist mechanism is actuated to increase the magnitude of the forward packing forces of the packer head during a subsequent mode of operation. In the event that the packer head fails to reach a forward position within a pre-set time period during the first mode of operation, a signal is generated which activates the subsequent mode of operation.

THE DRAWINGS

A preferred embodiment of the invention is illustrated in the accompanying drawings in which:

FIG. 14 is a rear-end view of the container, with parts broken away, depicting a mechanism for controlling the rate of rearward movement of an ejector head of the container;

FIG. 15 is a sectional view taken along line 15—15 of FIG. 14 with a portion of a guide channel broken away;

Figure 17:
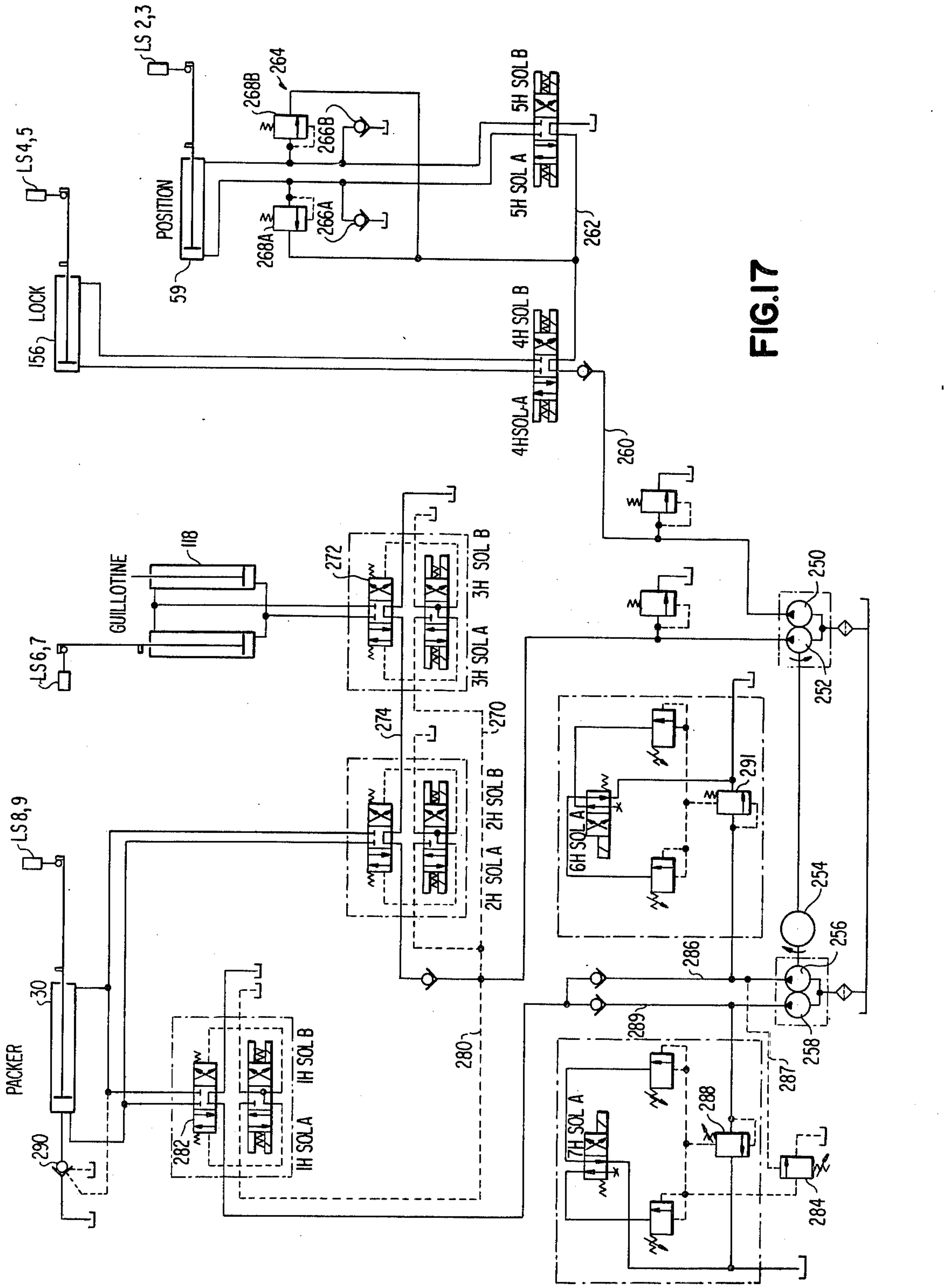

FIG. 16. is a schematic illustration of the container weighing circuitry for controlling operation of the packer assembly in accordance with container weight;

FIG. 17 is a schematic view of a hydraulic circuit for actuating hydraulic cylinders at the loading station; and FIGS. 18A through 18D are schematic views of an electric circuit for actuating the hydraulic circuitry.

DETAILED DESCRIPTION OF A PREFERRED EMBODIMENT OF THE INVENTION

A preferred loading station 10 in accordance with the present invention includes a packer assembly 12 and a loading dock 14 disposed thereahead. The packer assembly includes a refuse hopper or receptacle 16. The hopper 16 includes side walls 18, a bottom wall 20, and a top wall 22 which define a forwardly open discharge opening or mouth 24. The top wall 22 provides an inlet 26 for receiving refuse that is supplied to the receptacle in any convenient manner. A packer head 28 is mounted for reciprocation within the receptacle 16. The top of the packer head 28 is spaced from the top wall 22 of the hopper to define a gap 29 therebetween. A suitable power actuable mechanism, such as a hydraulic cylinder 30, is connected to the packer head to reciprocate the latter forwardly and rearwardly. During a forward stroke, the packer head 28 is operable to discharge refuse from the open mouth 24 of the receptacle.

The loading dock 14 includes four sections 32 of track which slidably support the wheels 34 of a reciprocable loading carriage 36. The carriage 36 includes side and end beams 38, 40 and a series of cross beams 42. Flanges 44 connected between pairs of cross beams serve to rotatably mount the wheels 34. As will be discussed, the cross beams 42 are arranged to removably support a refuse container 50. The track sections 32 are mounted on a weigh bridge 52, the latter being seated at its corners upon a plurality of load cells 54. As will be explained subsequently, the load cells 54 function to weigh the container during a loading operation.

A power actuable mechanism 56 is mounted on the loading dock 14 to reciprocate the carriage 36 toward and away from the packer assembly 12. More particularly, a stationary support 58 situated beneath the carriage 36 carries a hydraulic cylinder 59 which is connected to a cross beam of the carriage. Front and rear bumper members 60, 62 limit the fore and aft movement of the carriage.

The refuse container 50 includes top, bottom, and side walls 64, 66, 68 (see FIGS. 14, 15), and a movable rear wall or ejector head 70 slidably mounted in guide channels on the side walls, as will be discussed subsequently. In this manner, the ejector head 70 is capable of fore and aft movement within the container 50.

Figure 7:
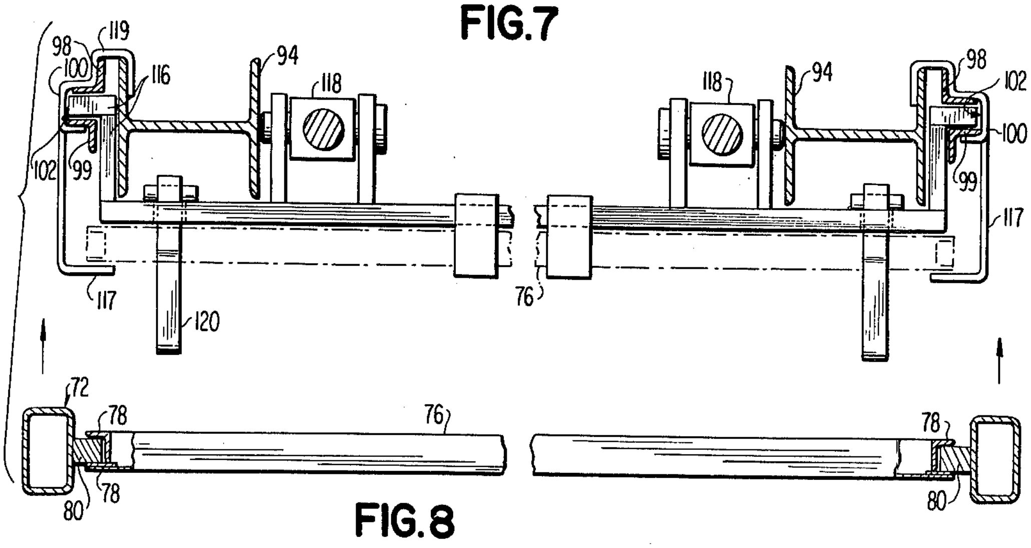
FIG. 7 is a sectional view taken along line 7—7 of FIG. 3 depicting the relationship between the front end of the packer assembly and the front end of the container as the container is shifted toward a refuse loading position.
Figure 8:
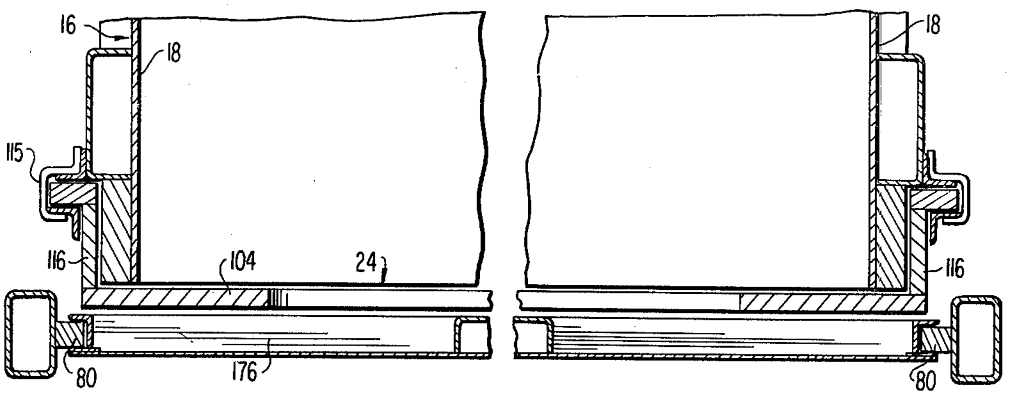
FIG. 8 is a sectional view taken along line 8—8 of FIG. 3 depicting the relationship between the front end of the packer assembly and the front end of the container when the container is disposed in the refuse loading position.
Figures 11, 12, 13:
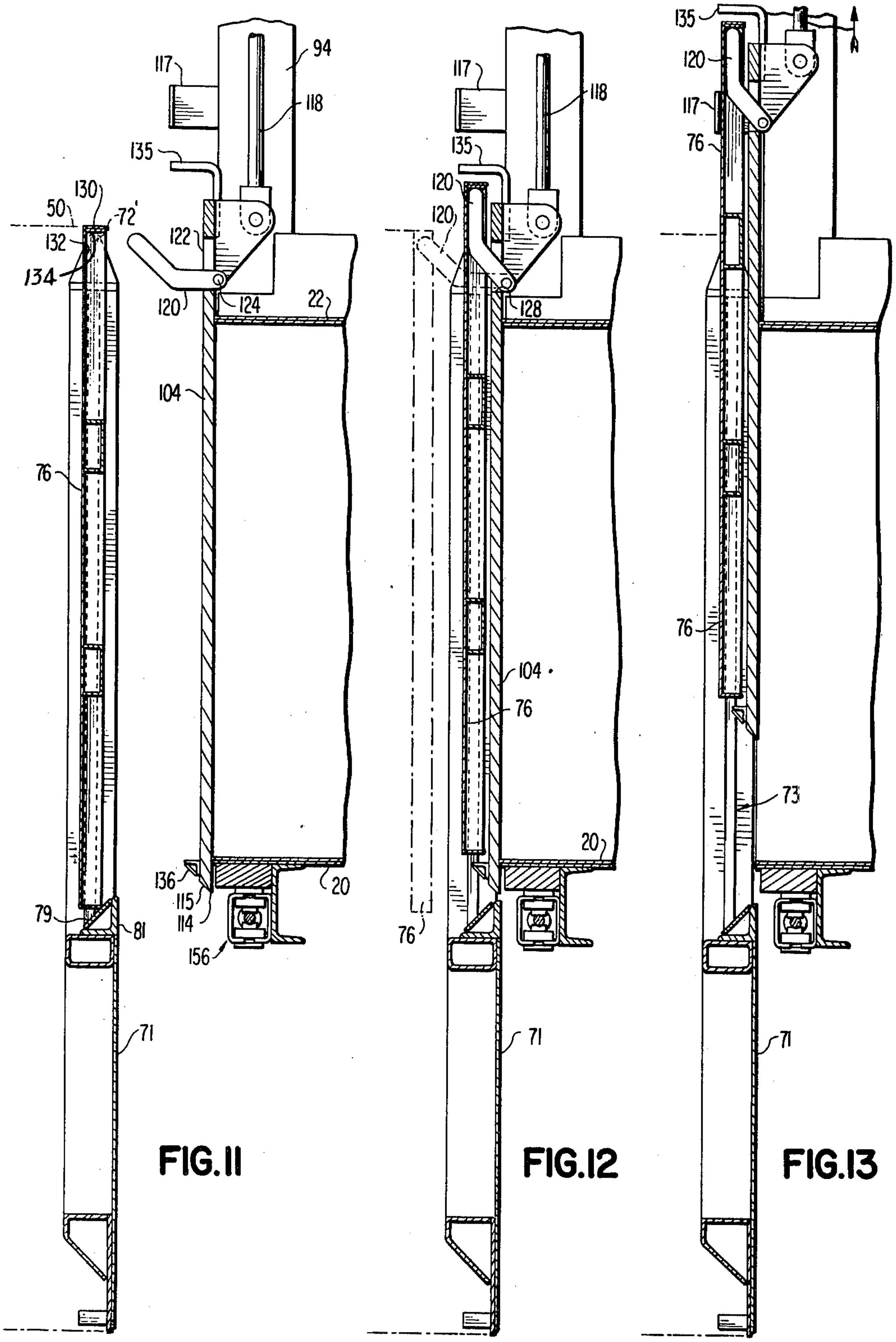
FIG. 11 is a side elevational view, with parts broken away, depicting the relationship between the front end of the packer assembly and the front end of the container as the latter approaches a refuse loading position.
FIG. 12 is a side elevational view, with parts broken away, depicting the relationship between the front end of the packer assembly and the front end of the container with the container being disposed in the refuse loading position.
FIG. 13 is a view similar to FIG. 12 depicting a closure member of the container being raised by the refuse clearing member.

The container further includes a tailgate 72 located at one end thereof. This tailgate 72 is hingedly mounted at 72' to the upper portion of the container to permit upward swinging movement of the tailgate about a horizontal axis. A bottom portion of the tailgate is closed by a plate 71. The tailgate has an opening 73 in its upper portion and a vertically slidable door panel 76 for covering this opening 73 (FIG. 11). That is, the door panel 76 includes vertical channel brackets 78 that are slidable along upright guide bars 80 carried by the tailgate (FIG. 7). The lower edge of the door panel normally rests atop a downwardly and inwardly inclined stop ledge 79 of a horizontal beam 81 which defines the lower edge of the opening 73. The tailgate 72 and the door panel 76 serve as closures for the front of the container. During a loading operation the tailgate 72 is maintained in a closed condition and the door panel 76 is opened by means to be discussed subsequently. During unloading of refuse the tailgate is opened.

The loading dock 14 is oriented relative to the packer assembly so that the opening 73 of the container 50 exposed by the sliding panel 76 is generally aligned with the mouth 24 of the packer assembly during a loading operation.

The container 50 is dimensioned to fit upon the loading carriage 36. The container 50 is operable to be lifted from and lowered onto the loading carriage 36 by means of any suitable lifting apparatus, such as a suitable motorized lift truck (not shown).

The carriage 36 includes a series of corner flanges 86 at the corners thereof within which the container 50 is nestingly received. This prevents displacement of the container during a loading operation.

Figure 3:
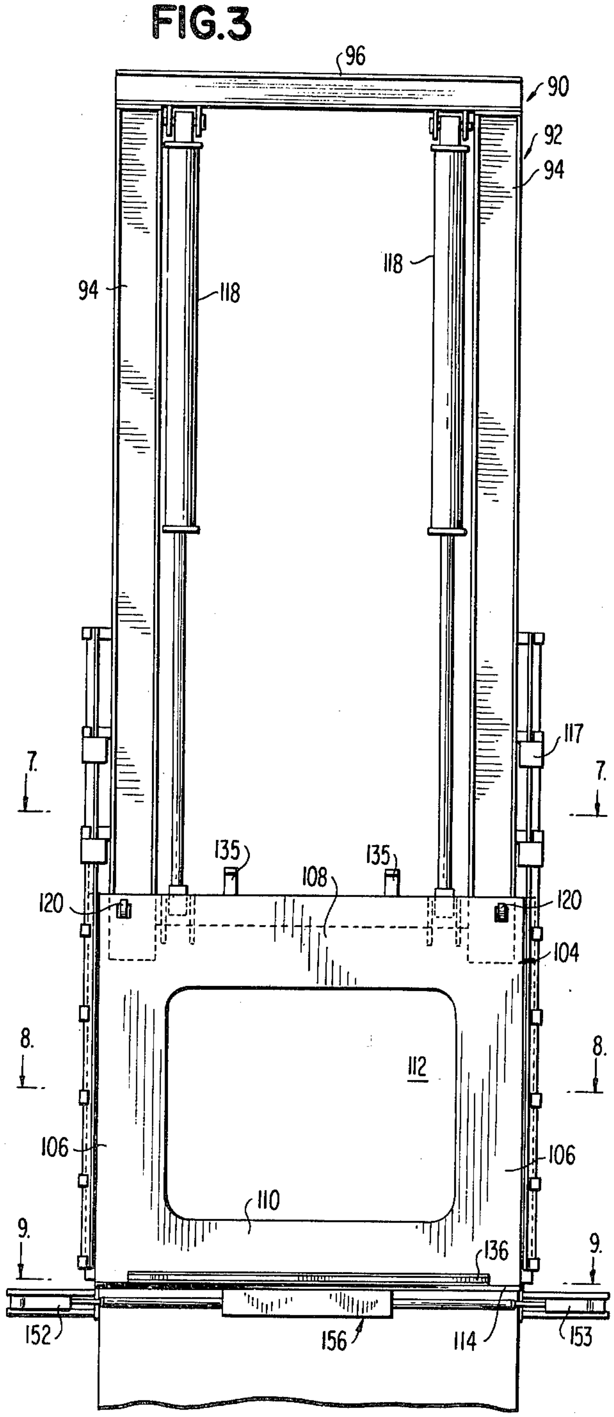
FIG. 3 is a front elevational view of the packer assembly taken along line 3—3 of FIG. 2, depicting a refuse clearing member in its downward position.
Figure 4:
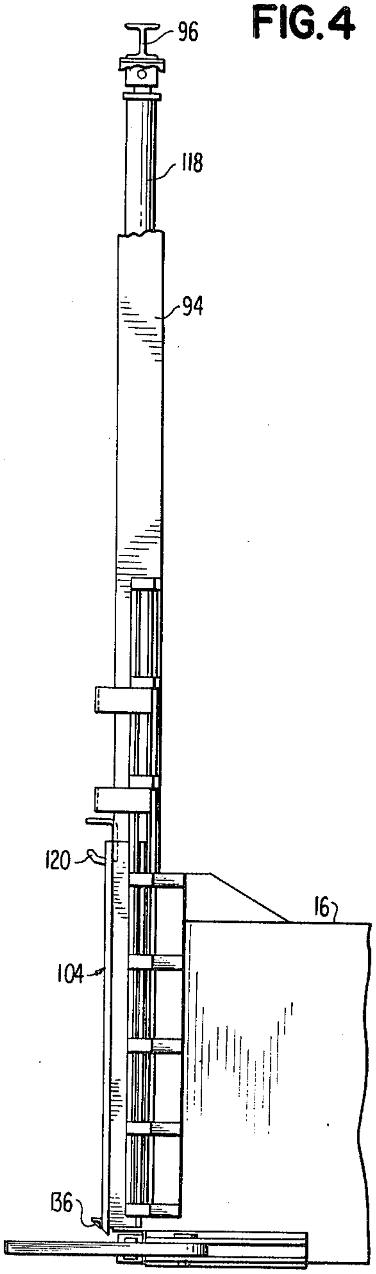
FIG. 4 is a side elevational view of a front portion of the packer assembly depicting the clearing member in its downward position.
Figure 5:
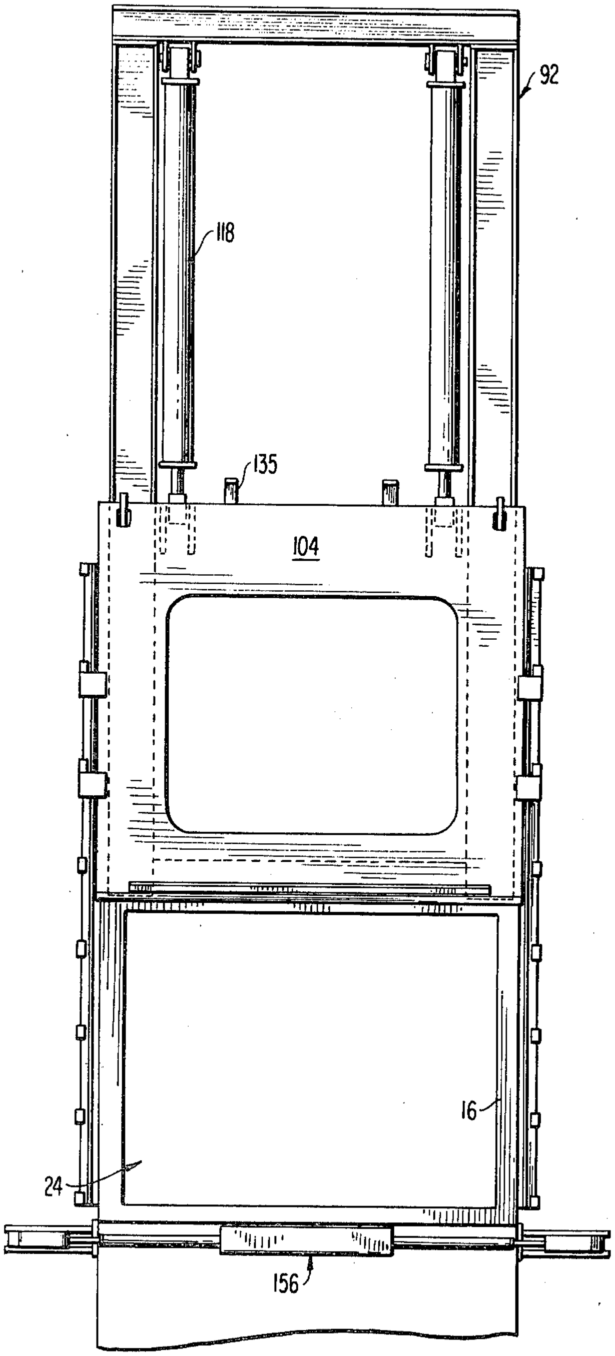
FIG. 5 is a view similar to FIG. 3 depicting the clearing member in an upward position.

Mounted at the front of the packer assembly 12 is a refuse clearing assembly 90 (FIGS. 3, 4, 5, 6, 7, 8, 11, 12, and 13). The refuse clearing assembly 90 includes a stationary framework 92 mounted between the carriage 36 and the packer assembly 12. The framework 92 includes a pair of upstanding posts 94 which straddle the mouth 24 of the packer receptacle 16 and a cross bar 96 intersecting the tops of the posts 94 (FIG. 3). Along outer sides of the posts are provided vertical guide bars 98, 99 which define vertical guide channels 102. Slidably mounted in these channels is a reciprocable clearing body 104. The clearing body 104 includes a pair of upstanding side sections 106, a top section 108 interconnecting the top ends of the side sections 106 and a lower section 110 interconnecting the lower ends of the side sections 106, thereby leaving the central portion 112 of the clearing body open (FIG. 3). The lower section 110 includes a horizontal cutter edge 114 formed by a bevel face 115. As the clearing body travels downwardly, the cutter edge 114 sweeps across the mouth of the hopper in guillotine-like fashion so as to sever any refuse in its path. Projecting from the side sections 106 are guide bars 116 which are slidably received within the vertical guide channels 102 of the framework 92 (FIG. 7). Suspended from the cross bar of the framework is a power actuable mechanism, preferably in the form of a pair of hydraulic lifting cylinders 118 which are connected to the top section 108 of the clearing body. Retraction of these hydraulic cylinders 118 raises the clearing body (FIGS. 5, 6), and extension of the cylinders 118 lowers the clearing body so as to sweep the cutter edge 114 across the mouth 24 of the packer hopper 16.

A plurality of brackets 119 are employed to secure the guide bars 98, 99 to the upstanding posts 94. Also, a plurality of flanges 117 are mounted to upper portions of the guide bars 98, 99 to guide the door panel 76 in its upper stages of travel as will be discussed.

Mounted on the top section 108 of the clearing body are a pair of lift arms 120 (FIGS. 3, 11). The lift arms 120 project through openings 122 formed in the top section 108. Each lift arm includes an inner end which is pivotally mounted at 124 on the packer side of the clearing body for vertical swinging movement, and an outer end facing the loading dock. Preferably, each lift arm 120 has a slight upward angular profile as depicted in FIG. 11. Downward swinging movement of the arms is limited by means of a stop shoulder defined by a wall 128 of the openings 122. The lift arms 120 cooperate with a lift plate 130 which projects forwardly from an upper portion of the door panel 76. That is, the lift arms 120 are arranged to underly this lift plate 130 as the container is advanced toward the packer assembly 12. As depicted in FIGS. 11 and 12, the lift arms are engaged by a front surface 132 of the advancing door panel 76 and are thereby caused to swing upwardly in response to continued advancement of the container. Thereupon, the upwardly swinging arms 120 abut a raising surface 134 on the underside of the lift plate, causing the entire door panel 76 to be partially lifted as the container advances. In this manner, the container is able to assume a position wherein the end of the opening 73 is essentially flush with the hopper mouth 24 to minimize spillage of refuse during actual loading of the refuse.

A pair of brackets 135 are secured to the top section 108 of the clearing body 104. These brackets 135 define shoulders which are disposed in overlying relation to the door panel 76 when the door panel has been lifted by the arms 120. As a result, during downward travel of the clearing body 104, closing of the door 76 will be power-assisted.

The clearing body has, along its bottom section 110 on the containerfacing side, a refuse deflection surface 136. This refuse deflection surface 136 is inclined upwardly and outwardly from the cutter edge 114 in general alignment with the bevel face 115. As the clearing body 104 sweeps across the front face of the packer head 28 at the end of a container loading operation, refuse is deflected into the container opening 73 by the bevel face 115 and the deflecting surface 136. This action, in conjunction with the cutting performed by the cutter edge 114, serves to clear refuse from the end of the opening 73, allowing the door 76 to be closed.

As a container 50 is advanced toward the packer assembly and the lift arms 120 partially raise the door panel 76 as previously mentioned, the bottom edge of the door panel 76 is allowed to move into overlying relationship with the surface 136. During downward travel of the door panel, the deflecting surface 136 clears the way for the door panel by deflecting refuse located therebelow into the container. In this manner, closing of the door panel is facilitated.

Figure 10:
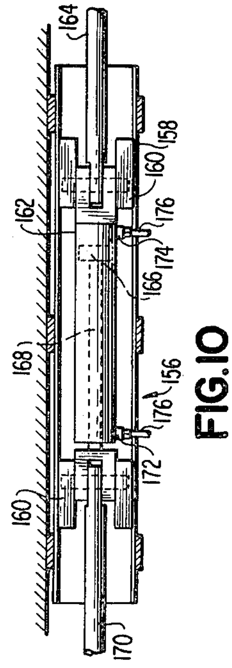
FIG. 10 is a longitudinal sectional view of a fluid actuated unit for operating the locking mechanism taken along line 10—10 in FIG. 9.
Figure 2:
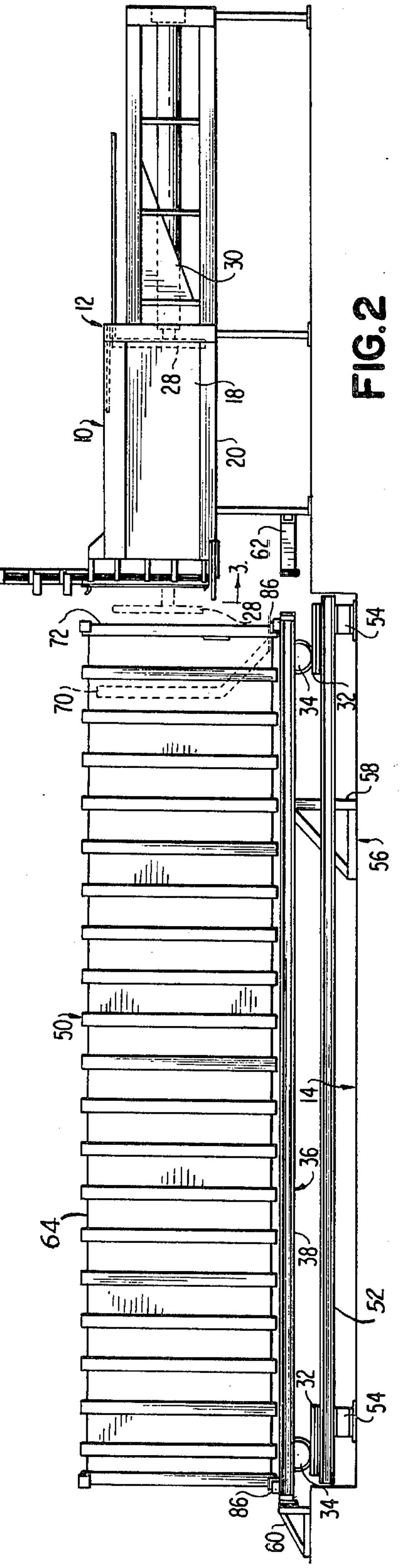
FIG. 2 is a side elevational view of the loading station of FIG. 1 with the refuse container being removed and with a portion of a packer assembly being broken away for clarity.
Figure 9:
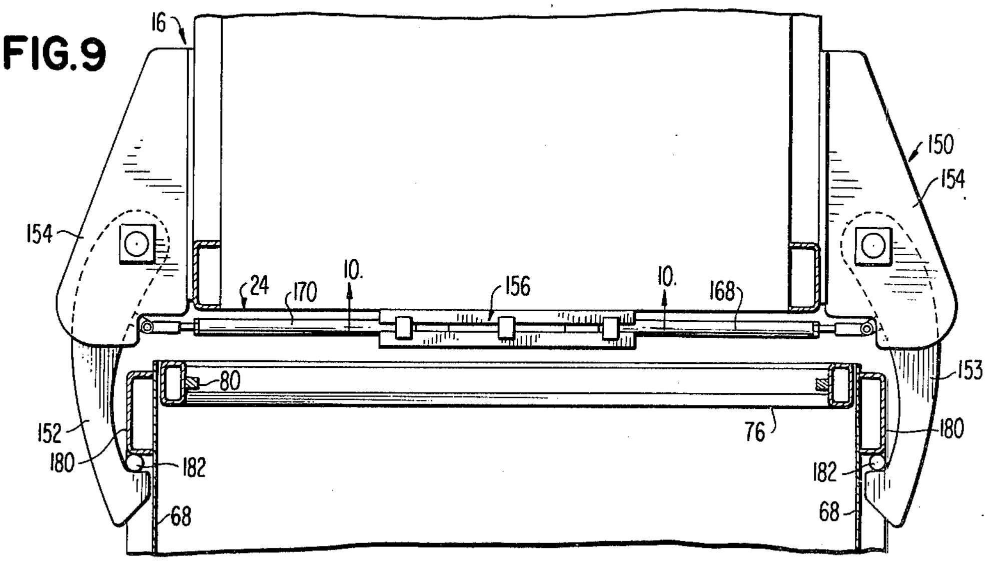
FIG. 9 is a sectional view taken along line 9—9 of FIG. 3 depicting a locking mechanism for securing the container against movement relative to the packer assembly.

When the container 50 has been advanced by the carriage 36 to a loading position preparatory to a loading operation, the container 50 is secured relative to the packer assembly 12 prior to operation of the packer. This is achieved by means of a latching assembly 150 (FIG. 9). The latching assembly 150 includes a pair of locking arms 152, 153, preferably hook-shaped, that are pivotally mounted for horizontal swinging movement on brackets 154 at the front of the hopper 16 below the hopper mouth 24. Connected to both of these hooks 152, 153 is a power actuable mechanism in the form of a hydraulic cylinder unit 156 (FIG. 10). The hydraulic cylinder unit 156 includes a sleeve 158 having slide bushings 160 mounted therein. Mounted for reciprocable movement within the sleeve is a floating hydraulic cylinder housing 162. The cylinder housing 162 is pivotably mounted to a connecting rod 164 that, in turn, is pivotably connected to one of the hooks 153. Reciprocably mounted within the cylinder housing 158 is a piston 166 carrying a piston rod 168. Pivotably connected to the piston rod 168 is another connecting rod 170 which is pivotably connected to the other hook 152. Hydraulic fittings 172, 174 are provided in the cylinder housing 162 for connection to conventional flexible fluid hoses 176 for admitting hydraulic fluid to opposite sides of the piston 166. The application of pressurized fluid to one side of the piston via fitting 172 causes the piston 166 to be shifted in one direction (i.e., to the right in FIG. 10) and causes the cylinder housing to be shifted in the opposite direction (i.e., to the left in FIG. 10). As a result, the hooks 152, 153 are pivoted inwardly to locking positions (FIG. 9). Application of hydraulic fluid to the opposite side of the piston 166 via fitting 174 reverses this movement of the piston and cylinder housing, causing the hooks to be swung outwardly to unlocking positions.

The container side walls 68 include a pair of upright beams 180, each beam including a steel rod 182 situated along a rear end thereof (FIG. 9). The rods 182 define abutment surfaces to be engaged by the hooks when the latter are in locking positions. During a locking procedure, the carriage actuating cylinder 59 advances the loading carriage 36 and the container 50 toward the packer assembly 12 such that the rods are advanced beyond a point necessary for engagement with the hooks 152, 153. The hydraulic cylinder unit 156 is then actuated to swing the hooks 152, 153 inwardly to locking positions. Thereafter, the carriage actuating cylinder 59 is retracted to back the rods 182 into firm engagement with the hooks as depicted in FIG. 9. In this manner, the container is firmly held against the locking hooks 152, 153. Also, a slight spacing is provided between the front of the container 50 and the clearing body 104 to allow the body to travel generally unimpededly. Even more importantly, as the container 50 is being loaded by the packer, the firm contact between the container and locking arms 152, 153 tends to minimize vibration.

During a loading operation, the packer head 28 rams refuse into the opening 73 of the container. As the refuse bears against the ejector head 70 of the container, it tends to displace the ejector head rearwardly. In accordance with the present invention, mechanically-induced friction forces are imparted to the ejector head so as to resist such rearward displacement in a controlled manner. In so doing, the refuse being loaded is caused to be compacted, thereby maximizing the use of container space. A compaction control mechanism 188 for imparting the mechanically induced friction forces is more fully set forth in afore-mentioned copending application Ser. No. 641,371, now U.S. Pat. No. 4,044,914, but will be summarized herein as follows.

The ejector head 70 includes, at each side, a pair of upper and lower rigid beams 190, 192 (FIG. 14) that are slidably mounted in channels 194 affixed to the inner sides 68 of the container (FIG. 14). This arrangement serves to guide the ejector head 70 for fore and aft travel within the container. The lower beams 192 are rigidly affixed to the ejector head 70. The upper beams 190 are interconnected by a cross bar 196 and are capable of limited vertical movement, relative to the ejector head. Upright lugs 198 mounted on the rear of the ejector head serve to guide the cross bar 196 during such movement. A pair of crank arms 200 are pivotably mounted on the ejector head beneath the cross bar 196 and adjacent the lower beams 192 such that rotation of the crank arms 200 in one direction (i.e., counter-clockwise movement as viewed in FIG. 14) lifts the cross bar 196 and the upper beams, and rotation in the other direction permits the cross bar and the upper beams to descend. Resilient brake or friction pads 202, 204 are mounted on the upper and lower beams. The lower friction pads 204 remain in continuous contact with the channel 194 to support the ejector head within the container. In response to rotation of the crank arms 200 in a direction producing upward movement of the upper beams, the upper and lower friction pads 202, 204 are urged into firm frictional engagement with the channels 194 to mechanically resist travel of the ejector head. To produce such rotation of the crank arms 200 a coil compression spring 206 is provided which acts upon both of the crank arms 200 by means of a pair of connecting rods 208. The spring 206 continuously biases the crank arms 200 in a friction-applying direction. The degree to which mechanically induced frictional resistance forces are thus applied to the container can be regulated by means of adjustable stop bolts 210 which can limit the amount of expansion of the spring 206.

The compaction control mechanism 188 can be deactivated during a container unloading operation by a deactivating linkage 212 which need not be discussed herein in detail. For further discussion thereof, see afore-mentioned copending application Ser. No. 641,524. Suffice it to say that the deactivating linkage 212 is intended to be automatically operated during unloading of the container at an unloading station.

The compaction control mechanism 188 enables compaction of the refuse to occur as the refuse is being inserted into the container. As a result, greater efficiency is exhibited over systems wherein refuse is compacted within the hopper prior to being inserted into the container.

The sequence of operations performed at the loading station can be summarized as follows. A container 50 is positioned on the carriage 36. Cylinder 59 advances the carriage 36 and thus the container toward the packer assembly. Near the end of this travel the automatic lift arms 120 are pivoted upwardly by the container, thereby partially raising the door 76 (FIGS. 11-12). The cylinder unit 156 closes the lock arms 152, 153 (FIG. 9) and then the cylinder 59 retracts the carriage to firmly engage the lock arms with the abutment rods 182. The clearing member 104 is then raised by cylinders 118, thereby raising the door 76 through the lifting action of the arms 120 (FIG. 13). The packer head 28 is reciprocated by the cylinder 30 so as to ram refuse into the container 50. Compaction of the refuse is regulated by the forces being applied to the ejector head 70 by the compaction control mechanism 188 (FIG. 14). Operation of the packer head can be terminated as the result of manual or automatic control, as will be discussed subsequently.

Figure 6A:
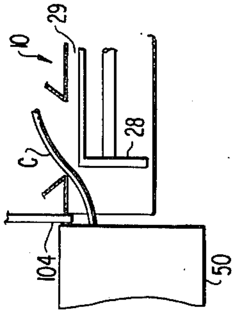
FIG. 6A is a schematic side elevational view of a front portion of the packer assembly and a situation which might occur during a loading operation.

As the container is being filled with refuse, it may occur that an elongate article, such as a tubular metal support C of a child's swing set, for example, may become lodges between the inlet 26 of the hopper and the container, as depicted in FIG. 6A. Efforts to transfer this article C into the container may be hampered by a tendency for the article to occupy the gap 29 during advancement of the packer head 23. The present invention includes steps for transferring the article under such circumstances. More particularly, the packer head is retracted from the discharge opening 24 and the clearing member is lowered into contact with the article. In this fashion, a portion of the article becomes crimped downwardly away from the gap 29 and into the path of the packer head 28. When the clearing member has been subsequently raised, the packer head is advanced to shift the article toward the container. These steps can be repeated at least until the article C clears the inlet 26, relieving the tendency of the article to occupy the gap 29.

When the container has been suitably filled, the cylinders 118 lower the clearing body 104 to sweep the cutter edge 114 across the front face of the packer head 28, the edge severing any refuse in its path. The deflecting surfaces 115, 136 displace refuse into the container, clearing the way for descent of the door panel 76 whose descent may be aided by the shoulders 135 on the clearing body. Subsequently, the carriage is advanced to relieve the pressure between the locking arms 152, 153 and the rods 182, and the locking arms are then opened. The carriage is then withdrawn from the packer assembly, whereupon the container can be removed.

In achieving this operation attention is directed to a control circuitry depicted in FIGS. 17, 18 which enable operations to be carried out from a control panel at a main control station. In FIG. 17 there is depicted a schematic diagram of a hydraulic system for powering the hydraulic cylinders situated at the loading station. In FIGS. 18A–18D there is depicted, in schematic form, electrical circuitry for activating the hydraulic system. As will become apparent, this circuitry enables an operator situated at a main control station to operate all functions at the loading station.

As shown in FIG. 17, a plurality of hydraulic pumps 250, 252, 256, 258 are connected to a pump-driving motor 254. The pump 250 is connected via conduits 260, 262 to operate the carriage positioning cylinder 59 and the cylinder unit 156 for actuating the locking arms 152, 153. A fluid relief system 264 is provided for minimizing impact of the carriage 36 against the forward bumper 62, as will be discussed.

Directing attention to FIGS. 18A–18D, the electrical circuitry for actuating the hydraulic system will be discussed. Not that these figures contain numerical references 1-114 at the left of the figures to indicate various locations or lines of the circuit for simplified reference.

Connectors L1, L2, L3 (lines 1, 1A, 2) are connected to a source of power, such as a 480 volt three-phase branch circuit for example. Connectors L1 and L2 are connected to the cylinder actuating circuitry by a transformer TR (line 3). By closing switches SM (lines 1, 1A, 2) and S2 (line 6) power is supplied to the circuitry. When the operator then activates a key-operated selector switch SS1 (line 9), the master relay coil KA (line 9) is energized, thereby closing the normally open relay contacts CRA in line 15. Attention is directed to the right-hand side of FIGS. 18A–18C wherein there are identified the lines containing relay contacts that are controlled by the corresponsing relay coils. The symbol "K" designates the relay coil and the symbol "CR" designates the contacts controlled thereby. For example, coil K5 (line 28) operates the normally closed contacts CR 5 in line 20, the normally open contact CR 5 in line 22, and other contacts CR 5 in lines 23, 25, 30, 38, and 45.

When the switch SS1 (line 9) has been despressed, the indicator light LT-1 (line 11) will be illuminated if a container 50 is in place on the carriage 36. To effect this, a plurality of normally open limit switches LS1 and LS1A (line 10) are mounted on the carriage and are closed by the positioning of a container thereon.

By depressing the pump start button PB-2 (line 18), the relay KB is energized. Relay KB thereby closses all normally open relay contacts CRB, including those in lines 1, 1A, and 2 to operate the hydraulic pump motor 258. At this time the pump running indicator light LT2 (line 18) becomes illuminated.

Upon activating the relay KA being energized, the relay K12 (line 42) is energized since the clearing body, or guillotine 104 is in a downward position holding the limit switch LS6 (line 42) closed. The limit switch LS6 can be mounted at a convenient location on the loading station so as to be activated by the clearing body 104 in its up and down position (i.e., in an upward position the clearing body opens the switch LS6). The energized relay K12 closes the contacts CR 12 (line 20), thereby illuminating the advance carriage button LPB1 (line 23).

Thereupon, the operator closes the illuminated advance carriage button LPB1 (line 20) to energize the relay coil K2 (line 20) and thereby close contacts CR 2 (line 103) to activate solenoid 5HSo1A (line 103 and FIG. 17). The solenoid 5HSo1A is shifted to the right to communicate the conduit 262 with the piston end of the hydraulic cylinder 59 (FIG. 17), and the carriage is advanced. As the carriage reaches the front bumper 62, the limit switch LS3 (line 28) is engaged by the container and is closed, thereby energizing the coil K5 and deactivating the solenoid 5HSo1A via opening of the normally closed contacts CR 5 (line 20). The conduit 262 is thereby communicated with the hydraulic reservoi through the valve 5H. Continued advancement of the carriage under its own momentum causes a check valve 266A (FIG. 17) to be opened, allowing free flow from the reservoir to the piston end of the cylinder 59. The rod end of the cylinder 59 forces open a relief valve 268B, re-directing fluid from the cylinder 59 into the conduit 262 and through the valve 5H and thence into the reservoir to dissipate some of the momentum of the carriage. During retraction of the carriage, the same action occurs via check valve 266B and relief valve 268A.

In response to closing of the switch LS3 and energization of the relay K5, the container-advanced light LT4 is illuminated (line 29), and the close locks button LPB3 (line 31) is illuminated. Thereupon, the operator depresses this button LPB3 (line 30) to energize coil K6 (line 30) and thereby actuate the solenoid 4HSo1B (line 102 and FIG. 17). This causes the cylinder unit 156 to be retracted to swing the locking arms 152, 153, closed (FIG. 9). In response to this movement, the limit switch LS5 (line 36) is enaged and closed, thereby closing the normally open contacts CR 9 (line 30) to deactivate the relay K6 and the solenoid 4HSo1B. Also, the return carriage button LPB2 (line 25) is illaminated.

The return carriage pushbutton LPB2 (line 11) is then pushed by the operator to energize the relay K3 and thereby activate the solenoid 5HSo1B (line 107). Accordingly, the carriage is moved away from the packer assembly 12 until the rods 182 firmly engage the locking arms 153, (FIG. 9). At this point the limit switch LS3 (line 28) opens, thereby deenergizing the relay K5 to open the contacts CR 5 in line 22 and thereby deactivate solenoid 5HSo1B. Now, the pushbutton LPB5 (line 39) is illuminated indicating that the clearing body should be raised.

The operator depresses this button LPB5 and the relay K10 is energized, thereby activating solenoid 3HSo1B (line 97). Hydraulic fluid from the pump 252 is directed through the pilot conduit 270, through the valve 3H and against the right-hand side of a valve 272. This shifts the valve 272 in a manner causing fluid from the conduit 274 to be directed to the rod sides of the cylinders 118. Accordingly, the clearing body 104 is raised and eventually closes the limit switch LS7 (line 44). This illuminates the light LT8 (line 45) indicating that the clearing body has been raised, and energizes the relay K13 (line 44) to deactivate relay K10 (line 38) as by closing the contacts CR 13 (line 38). This deactivates the valve 3H. Also, the contacts CR 13 (line 45) are closed to energize relay K14 (line 46) thereby closing contacts CR 14 (line 48) to supply power to an automatic refuse loading circuit. The automatic cycle button LPB7 (line 47) becomes illuminated as relay K14 is energized.

The operator then pushes the illuminated automatic cycle button LPB7 (line 48) to energize the relay K15 (line 49). This causes contacts CR 15 (lines 51, 76) to close, allowing power to be conducted to either of the relays K24 (line 78) or K25 (line 80), depending upon the condition of the contacts CR 17 in lines 77 and 79.

Figure 1:
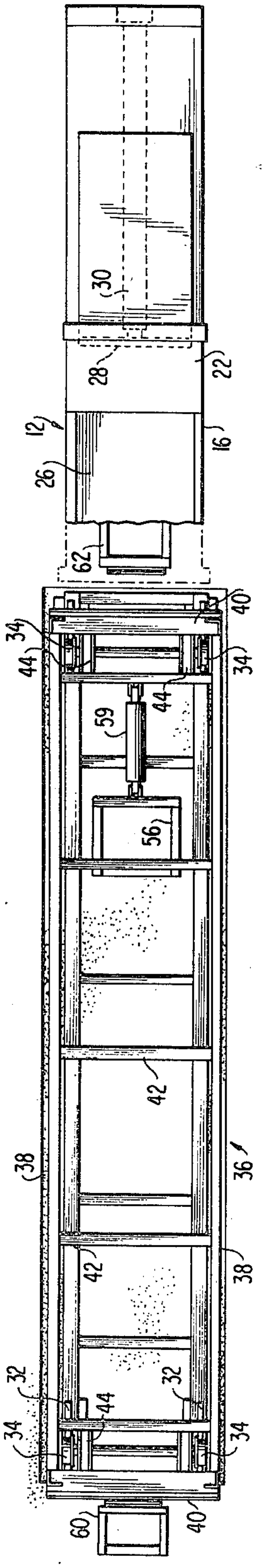
FIG. 1 is a plan view of a loading station for loading refuse into a container, in accordance with the present invention.

The condition of these contacts CR 17 is governed by relay K17 (line 52) which, in turn, is controlled by relay K16 (line 51) via contacts CR 16 (line 52) and by relay K18 (line 54). The relays K16 K18 are controlled by limit switches LS8 (line 50) and LS9 (line 54) (FIG. 17). Limit switch LS8 is open, and switch LS9 is closed, when the packer head 28 is in a rearward position (FIG. 1). Conversely, when the packer head 28 is in a forward position (FIG. 6), the switch LS8 is closed and switch LS9 is open.

Figure 6:
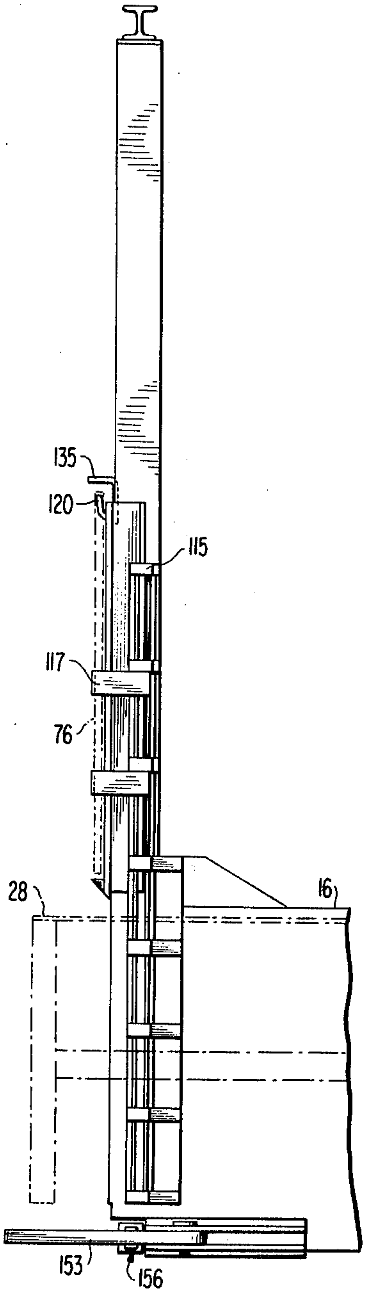
FIG. 6 is a view similar to FIG. 4 depicting the clearing member in its upward position.

Thus, at the initiation of a loading cycle the packer head 28 is in a rearward position. The coils K16 and K17 are, therefore, deenergized and power is conducted through the contacts CR 17 (line 77) to energize the relay K24 (line 78). This relay, in turn, activates the valve 1HSo1A (line 85) to direct hydraulic fluid from pilot conduit 280 against the left side of valve 282. Pressurized fluid from pumps 256, 258 is thereby directed to the piston side of the cylindr 30 to advance the packer head 28. At its forwardly advanced position during a loading mode of operation, the packer head is extended beyond the hopper mouth and into the container (FIG. 6).

A relief valve 288 is provided to relieve excessive pressure in conduit 289, should such excessive pressure occur. That is, pressure buildup in line 287 acts upon an unloading valve 284 through a pilot conduit 287 from the pump 256. The valve 284 is shifted so as to communicate the pilot side of the relief valve 288 with the fluid reservoir. Consequently, the valve 288 is opened, allowing fluid from pump 258 to travel to the reservoir.

When the packer head has been advanced, it closes the forward packer limit switch LS8 (line 50) and opens the limit switch LS9 (line 54) FIG. 17. Therefore, the relay K 17 is energized and the relay K18 is deenergized. As a result, the contacts CR 17 (line 79) and CR 18 (line 80) are opened to energize the relay K25. This produces activation of the solenid 1HSolB (line 89), causing the packer head to be retracted. A pilot actuated check valve 290 is provided to facilitate conveyance of fluid from the piston end of the cylinder to the reservoir.

A limit switch LS10 (line 83) is arranged to be engaged and closed by the packer head 28 within two or three inches of the end of the forward and return packer head stroke. That is, just as the packer head reaches the termination of its forward or rearward stroke, it closes the switch LS10 and energizes the relay K27. This, in turn activates the solenoid 7HSo1A (line 111) to relieve the pressure at the pilot end of the relief valve 288 and communicate the pump 258 with the reservoir to reduce final impact of the packer head. The solenoid 7HSo1A is deactivated unless the limit switch LS10 is closed.

When the packer return limit switch LS9 (line 54) is closed in response to return of the packer head the relay coils K16 and K17 will be deenergized and the packer will again be advanced. Such cycling of the packer head, in conjunction with the depositing of refuse into the hopper 1 serves to gradually fill the container with refuse. Under the action of the oncoming refuse, the ejector head 70 is urged progressively rearwardly. This rearward travel is resisted in a controlled manner by the resisting forces being imposed by the compaction control mechanism 188. As a result, a selected compaction of the refuse is obtained. Cycling of the packer head during a refuse loading mode of operation will continue repeatedly until terminated by one of a number of occurrences. Among such occurrences are:

(1) Attainment of predetermined container weight, with packer head 28 in rearward position (automatically determined), (2) attainment of sufficiently high resistance to packing (automatically determined), (3) manual activation of receptacle clearing button PB4 (line 57), and (4) manual activation of stop cycle button PB3 (line 48).

Regarding the first of these occurrences it will be recalled that the container is weighed by load cells 54 which can be of a conventional nature. These load cells 54 supply electrical signals of a magnitude that is proportionate to the weight being sensed. When the total weight sensed by these load cells 54 reaches a predetermined magnitude, the relay contacts CR W (line 58) will be closed. If the packer returns to a rearward position concurrently with the contacts CRW being closed, then the hopper clearing cycle will be automatically initiated, and will function in a manner to be later described. Actuation of the contacts CRW (line 58) can be accomplished in numerous ways, one such way being shown in FIG. 16. The load cells 54 which define the weighing scale are electrically coupled to a conventional summing amplifier SA which combines the signals from the load cells 54 and directs the resultant signal to a conventional signal comparator C. The comparator compares this resultant signal with a reference signal from an adjustable potentiometer P. When the summation signal equals and/or exceeds the reference signal, the relay coil KW is energized to close the normally open contacts CRW (line 58). Closing of the contacts CRW will not initiate a hopper clearing mode unless the packer head 28 is in a rearward position to energize the relay K18. In this fashion, a true weight reading can be obtained which will not be influenced by forces being imposed by the packer head.

In the event that refuse being loaded is of relatively lightweight material, the container may be filled before reaching the preselected weight for activation of the contacts CRW. In such an event a pressure switch SPS1 (line 55) and a timer T1 (line 55) are employed to initiate a hopper clearing mode of operation. The switch SPS1 is connected in any suitable manner so as to be closed in response to pressurization of the packer cylinder 30 during a packer operation. For example, the switch SPS1 can be connected to the fluid conduit which conducts fluid to the piston side of the cylinder 59. In so doing, the timer T1 is energized. Under normal conditions, i.e., wherein the packer head 28 does not encounter excessive resistance, the packer head will complete its advancing stroke within the preset timing period. Thus, when the packer head is returned, pressure on the switch SPS1 is relieved, causing this switch to open and thereby deactivate the timer T1. In the event that the packer head encounters significant resistance, as when the container nears a fully packed condition, the high pressure pump 256 may be vented to the reservoir by forcing open a relief valve 291 (FIG. 17). If progress of the packer head is so slow that the packer head is unable to complete its advancing stroke within the timed period, the time T1 "times-out" and closed the switch ST1 (line 56). This energizes the relay K19 (line 59) and the hopper clearing mode is initiated.

In the hopper clearing mode the relay K19 activates the solenoid 6HSo1A (line 108). As a result, pilot pressure acting on the valve 291 is increased to close the valve 291 and direct the full fluid force of the high pressure pump 256 to the cylinder 30 to advance the packer head 28 through the remainder of its advancing stroke.

When the packer head has been fully advanced, the limit switch LS8 (line 50) closes and the relay K17 is energized and the relay K18 is deenergized. Consequently, the relay K25 is energized to return the packer head. Also, the counter C1 (line 61) will pulse one count in response to activation of the relay K16 when the packer head has reached its forward position.

The packer head will then be cycled forwardly and rearwardly by the previously discussed operations, with the counter C1 pulsing one count each time the packer head reaches its advanced position. During this period refuse within the hopper will be collected and advanced forwardly. When a preselected number of pulses for which the counter C1 has been set have been reached, the counter C1 "counts out" and closes switch SC1 (line 64) to initiate a container closure mode of operation.

During the container closure mode the packer head continues to cycle, but does not reach the fully retracted position. Therefore, no additional refuse is received within the hopper 16 and the packer head functions to tamp refuse with short, high-powered strokes. In this connection, when the counter C1 "counts out", a counter C2 (line 65) is energized. Since the packer head is at the forward end of its stroke, the coil K17 is energized and thus energizes a closure mode timer T3 (line 67). The packer head will begin to retract, but timer T3 will "time-out" before the packer head if fully retracted. Timer T3 will thus activate a switch ST3 (line 53) to deactivate the relay K17. Since the switch LS8 had opened when the packer head began to retract, the relays K16 and K17 have been deenergized and the packer head is again advanced. This abbreviated cycling continues, with the counter C2 pulsing once each time that the packer head energizes relay K16 upon reaching a forward position. During this closure mode the packer head is advanced its full advance stroke at high pressure to clear the forward end of the container of refuse. When the counter C2 counts out, it activates switch SC2 (line 67). Subsequent timing-out of the timer T3 activates switch ST3 in line 67 to energize the relay K20 (line 68). As a result, the normally open relay contacts CR 20 (line 76) are closed to energize the relay K23 (line 75). The relay K23 closes the normally open contacts CR 23 (line 48) to deenergize the automatic packer circuitry. Meanwhile, the packer head 28 is being advanced in response to timing out of the timer T3. This advancement continues until a switch MS1 (line 72) is activated to produce slow advancement of the packer head. This magnetic switch energizes a relay K22 (line 72) when the packer head nears the mouth of the hopper. Energizing of the relay K22 during previous modes of operation had no effect in the absence of concurrent closing of the contacts CR 20. In any event, the relay K22 opens contacts CR 22 (line 77) to deactivate solenoid 1HSo1A and thereby block the high pressure pumps 256, 258 from the packer cylinder 30. Relay K28 also closes contacts CR 22 (line 84) to energize the relay K28. This relay K28 closes contacts CR 28 (line 90) to activate solenoid 2HSo1A and thereby direct fluid of lower volume from pump 252 to the piston end of the cylinder 30 to advance the packer head at a slow rate.

Such slow advancement continues until a switch PR1 (lines 69-70) is activated to energize the relay K21 (line 70). The switches MS-1 and PR-1 are of a conventional nature. The relay K21 opens contacts CR 21 to deenergize relay K14 and thereby deenergize relay K15 to shut off all power to the packer head which immediately stops. Switch PR1 (line 69) is positioned in the hopper so as to be activated in response to arrival of the packer head at the mouth of the hopper 16. Also in response to energization of the relay K21, the pushbutton LPB6 (line 40) is illuminated, indicating that the clearing member 104 should be lowered.

It is noted that anytime after initiation of the hopper clearing or container closure modes of operation, should the packer head fail to reach the forwardly advanced position before the timer T2 (line 56) times-out, the switch ST2 (line 73) closes, thereby energizing the relay K23. Relay K23 opens contacts CR 23 (line 48) to deenergize the relay K15 and thereby deenergize the automatic cycle circuitry to halt all movement of the packer head. Also, the closure mode alarm flasher LT12 (line 74) will begin flashing, indicating that manual operation is required.

Manual operation can be effected whenever the clearing body 104 is up, the automatic cycle circuit is deenergized, and the pumps 256, 258 are running. In operation, the pushbutton PB5 (line 78) is depressed. As a result, the relay K24 is energized to activate the solenoid 1HSo1A and advance the packer head. Also, the relay K26 is energized to activate solenoid 6HSo1A and make full system power available. When the packer head activates the forward limit switch LS8 (line 50), the relay K24 is deenergized and the packer head stops. The operator can then depress the return button PB6 (line 80) to energize the relay K25 (line 80) and return the packer head. Once the packer head activates the rearward limit switch LS9 (line 54), the relay K25 will be deenergized and the packer head will stop. The packer head will stop upon release of either the pack or return buttons PB5, PB6.

When the container closure mode of the packer head is finished, the button LPB6 (line 41) becomes illuminated and is depressed. Solenoid 3HSo1A is thus activated to lower the clearing body 104. During its descent, the cutting edge 114 sweeps across the front face of the packer head to sever refuse bridging the gap between the hopper and the container. Also, the deflecting surface 136 deflects into the container refuse located beneath the door panel 76.

As the clearing body is lowered, the door panel 76 will tend to descend therewith, aided if necessary by the shoulders 135 at the top of the guillotine. When it closes, the clearing member 104 activates limit switch LS6 (line 42) to deactivate the solenoid 3HSo1A. Next, the illuminated carriage advance pushbutton LPB1 (line 23) is pushed-to activate solenoid 5HSo1A and thereby advance the carriage to relieve pressure between the container bars 180 and the locking arms 152, 153 (FIG. 9). The limit switch LS3 is closed by the carriage to deactivate the solenoid 5HSo1A and halt the carriage. This illuminates the open-locks pushbutton LPB4 (line 33) which is then depressed to activate solenoid 4HSo1A to swing the locking arms 152, 153 to their unlocking positions. Switch LS4 (line 34) is closed when the locking arms have been swung open and further movement thereof ceases. The carriage return button LPB2 (line 25) becomes illuminated and is pressed to activate the solenoid 5HSo1B. This causes the cylinder 59 to return the carriage until the limit switch LS2 (line 27) is closed. At this point the container return light LT3 (line 26) is illuminated indicating that the securing bars 84 can be rotated to unlock the container from the carriage to permit removal of the container.

Figure 18A:
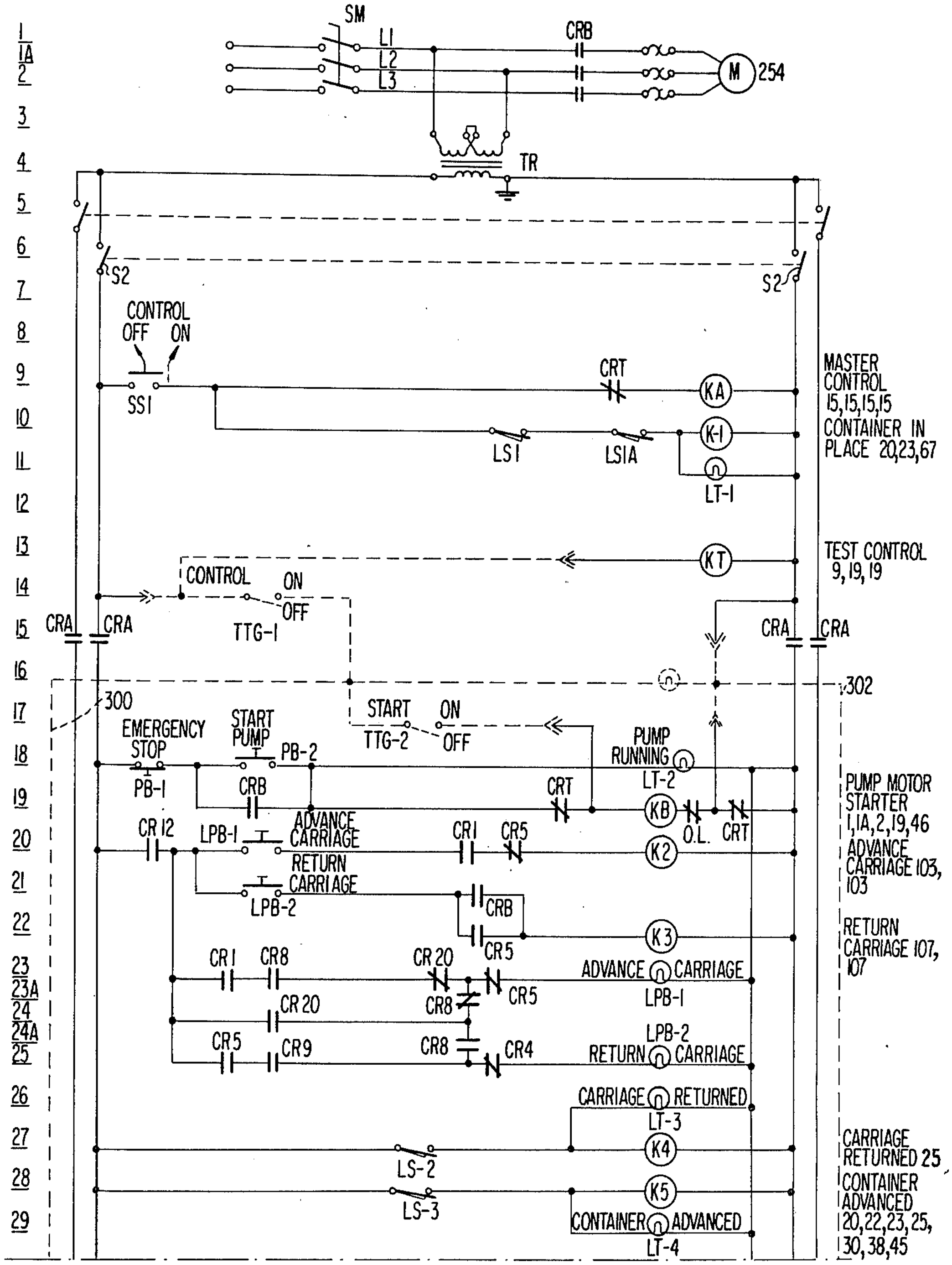
Figure 18B:
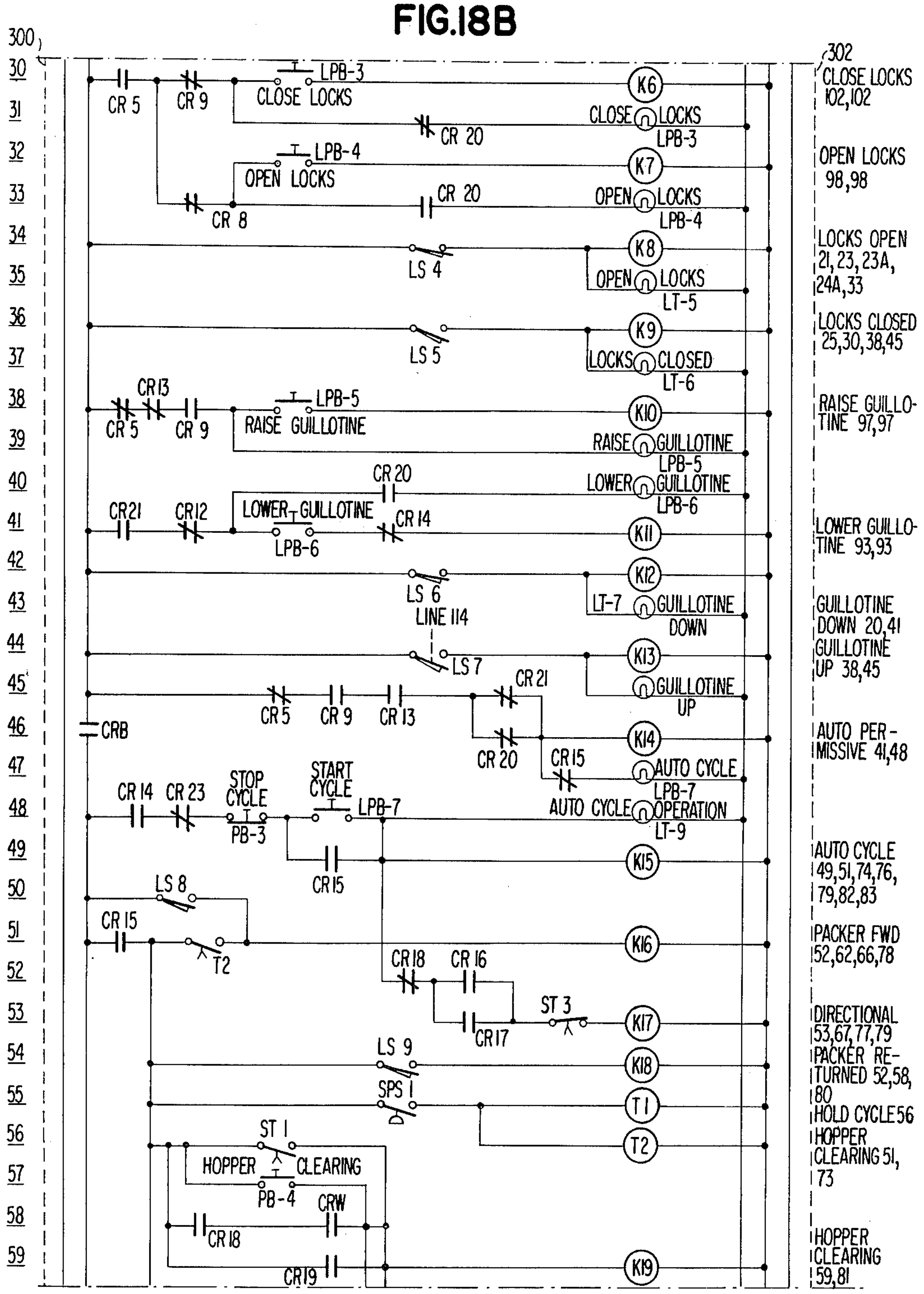
Figure 18C:
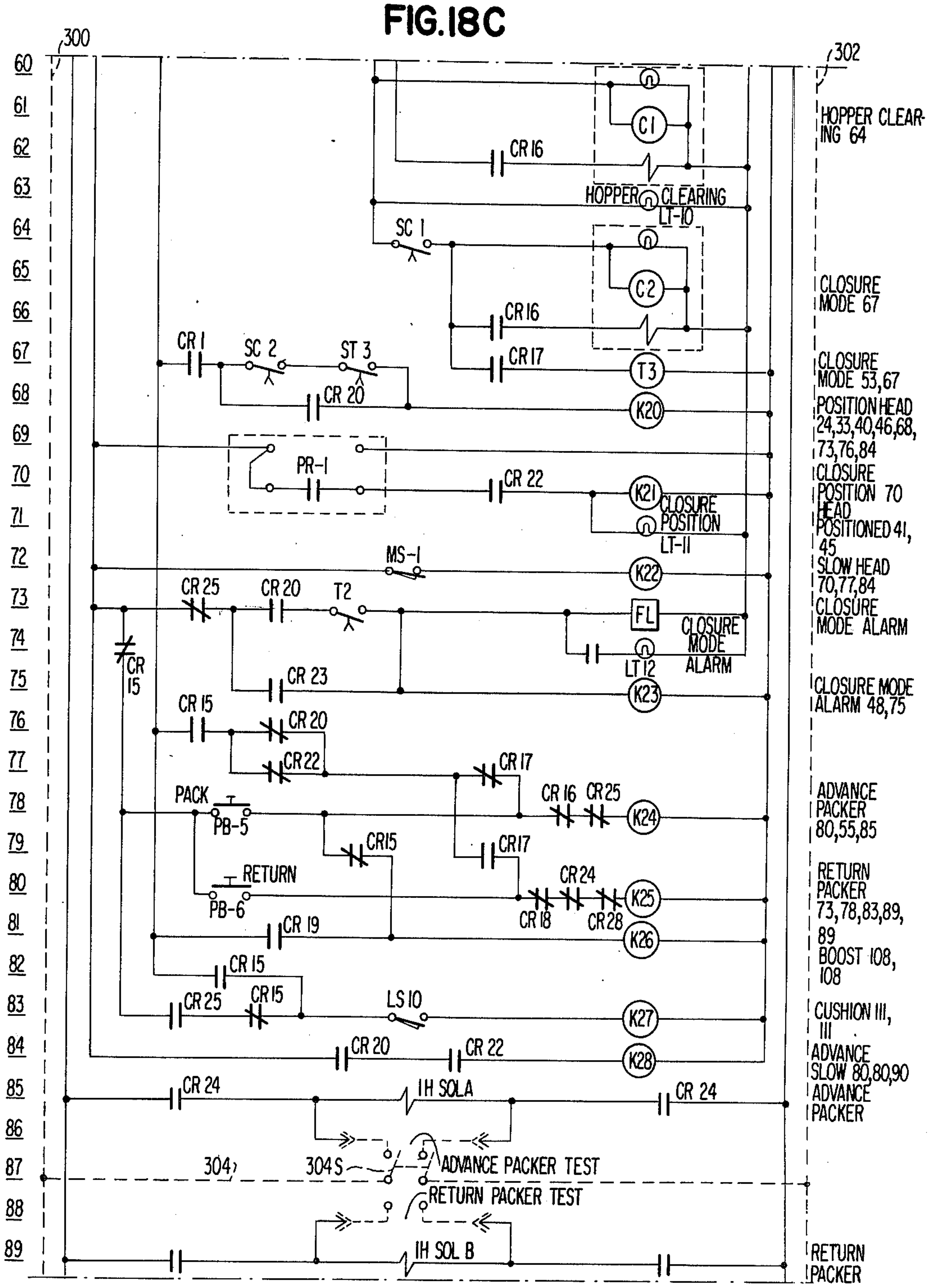
Figure 18D:
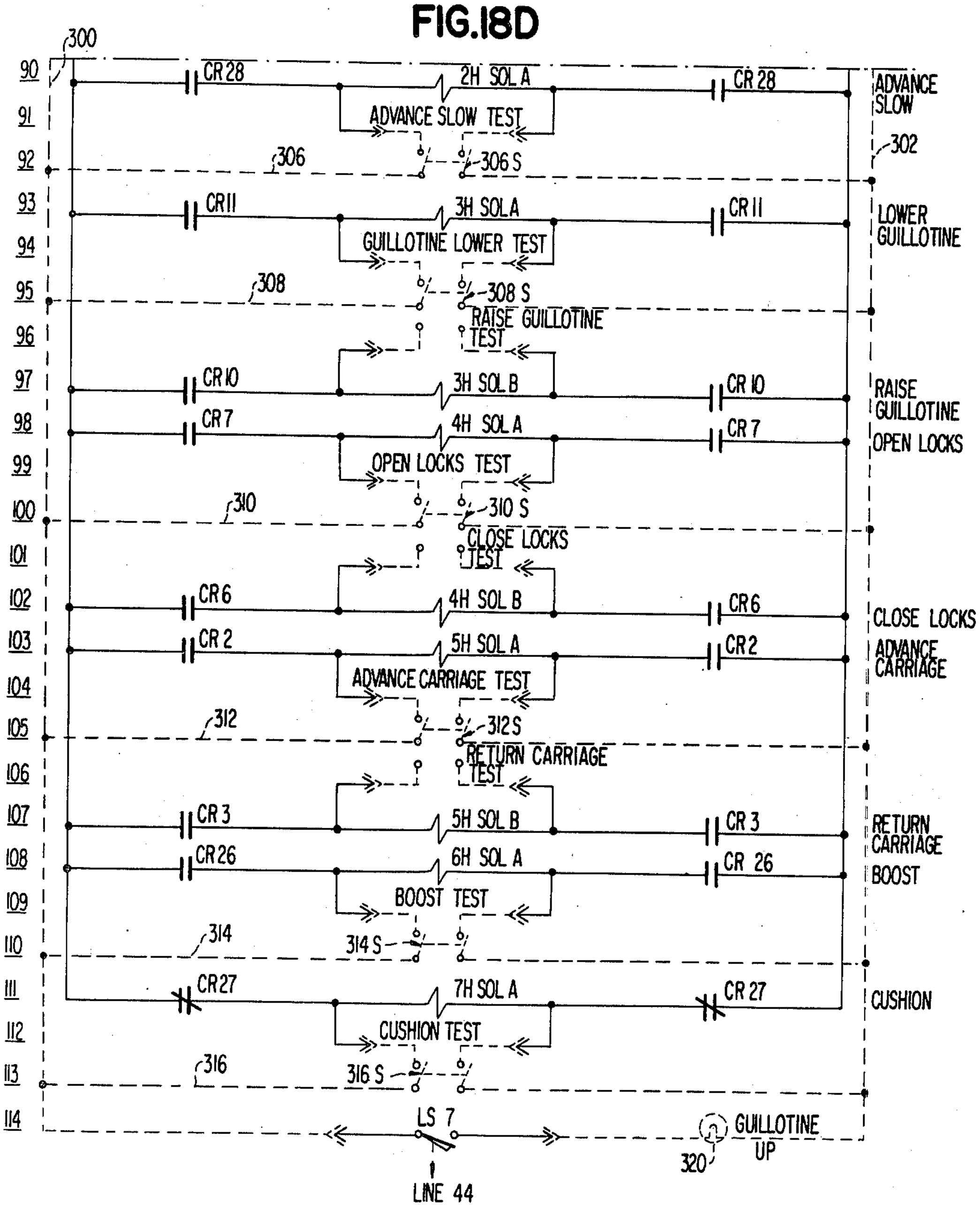

The control circuitry also includes an arrangement wherein the various cylinder actuating solenoids can be energized to test the operability thereof independently of the normal operating sequence and absent the presence of a container on the carriage. In FIG. 18D test conductors 300, 302 are depicted in phantom. A test control switch TTG1 (line 14) is operable to energize a test control relay KT (line 13) and thereby close the normally open contacts CRT in line 9 to prevent energization of the master control relay KA in line 9. A test start switch TTG2 (line 17) is closed to energize the pump motor relay KB to activate the pumps 250, 252, 256, 258. Attention is directed to FIGS. 18C, 18D wherein test circuits 304 through 316 are depicted. These circuits include manual control switches 304S-316S which are operable from the main control panel. The switch 304S can be operated to activate either of the solenoids 1HSo1A or 1HSo1B to advance or retract the packer head. The switch 306S can be operated to activate the solenoid 2HSo1A to test the slow advance speed of the packer head. The switch 308S can be operated to activate the solenoids 3HSo1A or 3HSo1B to test operation of the clearing member 104. The switch 310S can be operated to activate the solenoids 4HSo1A or 4HSo1B to test operation of the locking arms 152, 153. The switch 312S can be operated to activate the solenoids 5HSo1A or 5HSo1B to test operation of the carriage 36. The switch 314S can be operated to activate solenoid 6HSo1A in conjunction with testing of packer head advancement to test power boosting of the power head cylinder 30.

Finally, the switch 316S can be operated to activate the solenoid 7HSo1A in conjunction with packer head advancement and retraction to test operability of the packer head cushioning system. The limit switch LS7 is connected within the test circuitry (line 114) to illuminate a lamp 320 (line 114) when the clearing member has been raised during testing.

Among the major advantages provided by the present invention is the fact that minimal personnel are required in the loading of a refuse container. All of the power actuable motors are permanently secured at the loading station, and thus no power hook-ups to the containers are required.

Handling of the containers is facilitated by the use of a movable carriage which is permanently deployed at the loading station. Thus, upon being positioned on the carriage, the container is appropriately deployed to be acted upon by the various power actuators for effecting a refuse loading operation.

Opening and closing of the door panel is facilitated by a clearing member which is able to propel the door panel upwardly and downwardly, while clearing the way for the door panel during closing thereof. The pre-lifting of the door panel by the lift arms 120 enables the container to be advanced to close proximity with the mouth of the packer, thereby minimizing spillage. Such pre-lifting also assures that the deflecting surface 136 will be suitably positioned in underlying relation to the bottom edge of the door panel.

By backing the container into firm engagement with the locking arms, vibration effects are minimized during loading.

System efficiency is magnified by the packer control mechanism 188 which enables refuse loading and compacting to be accomplished simultaneously.

Control over the loading operation is enhanced by monitoring refuse weight and pressure during loading, and terminating the container loading cycle of the packer head in response to the attainment of a preselected weight or pressure.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method of shifting a vertically slidable closure positioned at one end of a refuse container, forming in part thereof, and including a forwardly projecting portion, for use with a refuse packer assembly including a vertically swingable lift arm, comprising the steps of:

advancing the container horizontally toward the refuse packer assembly such that the container contacts the lift arm and urges the lift arm upwardly;

continuing to advance the container horizontally to swing the lift arm upwardly;

engaging an underside of the forwardly projecting portion of the closure with the lift arm;

further advancing the container to further swing the lift arm upwardly to lift the closure through engagement between the forwardly projecting portion of the closure and the lift arm;

raising the lift arm while the container is stationary to further lift the closure to provide an opening for the admission of refuse into the container; and lowering the closure after refuse has been admitted into the container.

2. A method according to claim 1 wherein the refuse packer further includes a vertically reciprocable clearing member, an outwardly and upwardly inclined refuse deflection surface is positioned along the bottom section of the clearing member, the lift arm is mounted on the clearing member, and wherein:

the advancing step includes the step of advancing the container towards the clearing member;

the continuing step and the further advancing step include the step of moving the closure into an overlaying relation with the deflecting surface; and:

the step of raising the lift arm includes the step of raising the clearing member.

3. A method according to claim 2 wherein the clearing member includes a shoulder disposed in overlying relation to the closure when the closure has been raised by the lift arm and wherein the step of lowering the closure includes the step of bringing the shoulder of the clearing member into engagement with the closure to assist lowering the closure.

* * * * *